Sept. 3, 1935.    H. G. WEISS    2,013,020
MOTION PICTURE MACHINE CONTROL
Filed Oct. 24, 1931    2 Sheets-Sheet 1

Inventor
Henry G. Weiss
By Murray and Zugelter
Attorneys

Sept. 3, 1935. H. G. WEISS 2,013,020
MOTION PICTURE MACHINE CONTROL
Filed Oct. 24, 1931 2 Sheets-Sheet 2

Inventor
Henry G. Weiss
By Murray & Zugelter
Attorneys

Patented Sept. 3, 1935

2,013,020

UNITED STATES PATENT OFFICE 2,013,020

MOTION PICTURE MACHINE CONTROL

Henry G. Weiss, Cincinnati, Ohio, assignor to The Automatic Control Turnover Company, Cincinnati, Ohio, a corporation of Ohio Application October 24, 1931, Serial No. 570,805

27 Claims. (Cl. 88—16.2)

This invention relates to a control means for motion picture projecting machines and associated acoustic apparatus.

An object of the invention is to provide automatic means, operating mutually between two or more motion picture machines, for successive or alternate projection of pictures and sound in such perfectly timed sequence that the change from one machine to another is rendered imperceptible.

Another object of the invention is to provide means of the above stated automatic character whereby the machine operator's work is greatly facilitated, thereby enabling the operator to attend two or more machines without the assistance of a second operator or assistant.

More specifically, an object of the invention is to provide means, operating automatically as a picture film in one projection machine is unwound from its reel, to initiate operation of a second projection machine by closing the circuit of its projector light, starting its film advancing motor, and then withdrawing the shutter of the second machine simultaneously with the closing of the shutter of the first machine and the shifting of the sound projection means, subsequent to which operations the motor and projection light of the first machine are automatically de-energized. The second machine thereupon projects its reel of film, and as the film unwinds and nears its end or " trailing portion", the first machine is again automatically placed in operation, by the means of the invention, for projection of a third reel of picture film. The shifting from one machine to another thereby is rendered entirely automatic and the operator is required only to replace the film reel of one machine while the other machine is in operation.

The foregoing and other objects are attained by the means described herein and disclosed in the accompanying drawings, in which.

Figure 1:
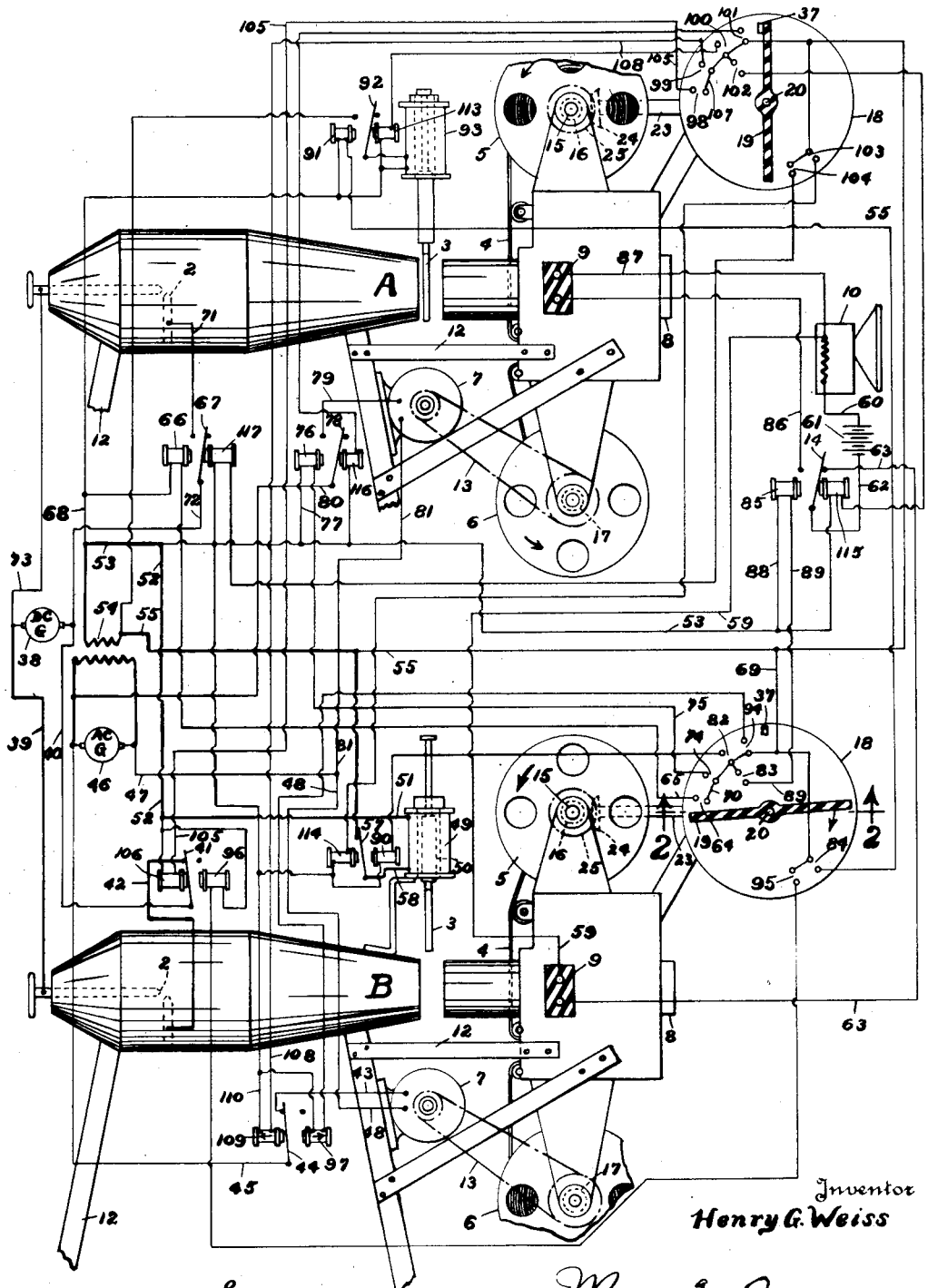
Fig. 1 is a view diagrammatical in nature showing two conventional picture projection machines equipped with the means of the invention, and disclosing a wiring diagram for electrical connection of the various electrical elements thereof.

In the respective picture projection machines indicated at A and B, 2 represents the illuminator or arc in a suitable casing; 3 is a shutter that may be interposed between the illuminator and the picture film 4; 5 is the reel from which the film is unwound; 6 is the receiving reel onto which the film is wound during projection of the picture; 7 is the motor for driving the receiving reel and advancing the film; 8 is the lens element of the machine; 9 is a device for initiating and controlling sound emitted simultaneously with projection of the picture; and 10 indicates a speaker or amplifier electrically connected with the device 9 of each machine. Each machine may be supported upon a suitable under structure 12, which may also support the motor 7, which motor may be caused to drive the receiving reel 6 by means of a belt or chain arrangement 13.

The foregoing elements and the arrangement as disclosed in Fig. 1, are old and well known in the art, wherefore it is considered unnecessary to describe in detail the function of said elements.

In accordance with the instant invention, the following cooperative relationship exists between the two machines indicated at A and B. Assuming that machine B is in operation, as indicated in Fig. 1 of the drawings, it is readily understood that its driven reel 6 is constantly receiving film from the reel 5, and the pictures of said reel are being projected because of the fact that shutter 3 of machine B is withdrawn and the illuminator 2 is in operation. Heretofore, it was necessary for one operator to stop and render inoperative the machine B, when the reel 5 became exhausted, while at the same time a second operator placed in operation the machine A which carried the next reel of film. It was necessary also for one of the operators to effect a change over of the sound mechanism from machine B to machine A simultaneously with the stopping of machine B and the starting of machine A. By means of the herein described invention, however, the machine B, which is in operation, automatically closes the electrical circuit of the illuminator and the motor of machine A as the film of machine B nears the end or tailing portion, and, at a proper time, simultaneously opens the shutter of machine A, closes the shutter of machine B, and throws an electrical switch 14 which places the speaker or amplifier 10 in condition to operate from the sound initiating device 9 of machine A. The means of the invention serves also to render completely inoperative machine B, by breaking the electrical circuit of its illuminator 2 and motor 7. Therefore while the machine A is in operation an operator may remove the film that was displayed by machine B and replace said film with a reel intended for projection after display of the film on machine A. As the film of machine A reaches the end of its travel, the mechanism of the invention operates to start the machine B as the machine A is rendered inoperative. From the foregoing it should be clearly understood that the machines will automatically operate alternately without the intervention of an operator except for arc adjustment and replacement of reels of film in the idle machine.

Of considerable importance to this invention is the fact that the reel 5, and its central shaft or axle 15, gain speed of rotation as the film is payed out and wound onto the receiving reel 6, this being due to the gradual increase in diameter of the hub of reel 6 and the gradual decrease in diameter of the hub of reel 5 as the film is transferred. The hubs of reels 5 are indicated at 16, and those of reels 6 are indicated at 17. This change in axle or reel speed is utilized for effecting the change-over from one machine to the other, because the hubs of all reels are of uniform diameter and consequently the last rotations of all paying reels 5 are of a definite or expected speed regardless of the length of film carried by such reels. The speeds of rotation of the shafts 15, therefore, may be relied upon for actuating a mechanism to automatically stop one machine and start the other machine simultaneously and with great precision at a predetermined time.

Figure 2:
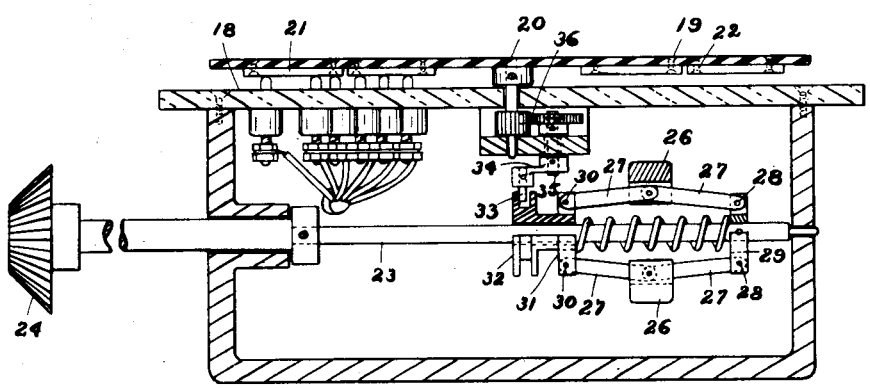
Fig. 2 is a cross-sectional view taken on line 2—2 of Fig. 1 showing in detail a device operating on the principle of a tachometer, for closing various electrical circuits including the control means for the projection lights, the machine motors, the shutters, and the sound control device.

The automatic start and stop means may include a device operating on the principle of a tachometer, and described as follows. At 18 is indicated a stationary electrical contact supporting board which if desired may be in the form of a disc. In alignment with the center point of the board is a contact bar 19, preferably of insulating material, and adapted to be rotated about its mid-point by reason of its being fixed upon a shaft 20. The contact bar has fixed thereto, on one of its faces, the electricity conducting contactors 21 and 22, which upon rotation of the contact bar will engage various electrical terminals as indicated in Fig. 2, for closing certain electrical circuits. The main shaft 23 of the device of Fig. 2 may be provided with any suitable means a gear 24 being shown, for transmitting motion from the reel supporting shaft 15 to the main shaft 23 of the device of Fig. 2. Gear 24 may engage a gear 25 fixed on the reel supporting shaft. Obviously, a belt or chain drive could be substituted for the gear drive just described.

On the main shaft 23 (Fig. 2) is mounted a governor device which may be of any suitable design, that shown comprising a pair of weights 26 pivoted to links 27 the free ends of which links are pivoted, at 28 upon a cross bar 29 fixed to shaft 23, and at 30 upon a cross bar 31 slidable on shaft 23. As the main shaft is rotated, the weights will extend themselves laterally, thereby causing the grooved collar 32, which is fixed to cross bar 31, to move longitudinally of the shaft. The amount of longitudinal movement of the collar is determined by the speed of rotation of shaft 23 and its effect upon the weights 26.

The grooved collar receives one end 33 of a crank 34, which crank is fixedly mounted on a shaft 35 journaled in suitable bearing means. Said shaft might of itself support the contact bar 19, but in order to gain increased movement of the contact bar through a circle arc, there may be provided the gearing 36 between the shafts 35 and 20.

From the foregoing it should be clearly understood that by gradually increasing the speed of rotation of the shaft 23, the contact arm or bar 19 will be moved comparatively slowly through an arc of a circle, so that the contactors 21 and 22 carried by the contact arm may successively contact the electrical terminals which are arranged on the stationary disc 18 of Fig. 1. The contact arm 19 may be moved in a clockwise direction of rotation, as indicated, and its movement may be limited by means of a stop or abutment 37. It is to be understood that other forms of tachometer or speedometer devices may be employed for moving the arm 19, wherefore the invention is not to be restricted to the use of the specific device illustrated and described. Also, by rearranging the electrical contacts on the board 18, the arm 19 may be supported on shaft 20 at one end of the arm instead of its mid-point.

As indicated in Fig. 1, machine B is in operation and machine A is idle. Machine B is nearing the end of its operating period as is evidenced by the fact that nearly all of the film has been transferred from the reel 5 to the receiving reel 6. Contact arm 19, it should be noted, has moved from its normally vertical position to a nearly horizontal position at which it is about to successively engage the pairs of contacts on board 18. As stated before, when the contact bar of machine B engages said contacts in succession, the machine A automatically has its illuminator circuit and its motor 7 energized, after which, at a proper time, the shutter 3 of machine A is opened simultaneously with closing of the shutter of machine B, and at the same time the acoustic mechanism is placed in electrical connection with machine A. Immediately thereafter, the device of the invention effects a breaking of the electrical circuits to the illuminator and motor of machine B, thereby rendering said machine completely inoperative and ready for replacement of its film reels.

Machine B, being in operation as illustrated, has its illuminator 2 connected in the circuit of a source of electricity 38, which may be a direct current generator. Said circuit comprises the conductors 39, 40, the closed switch 41, and a conductor 42. The motor 7 of machine B is operating, and it is included in an electrical circuit comprising conductor 43, the closed switch 44, conductor 45, a source of electricity 46 which may be a generator or the usual power line, the conductor 47, and conductor 48 terminating at the motor. The shutter 3 of machine B is retracted, as it must be while the machine is in operation, by an electromagnetic means 49 which may be a solenoid having a movable core 50 for actuating the shutter. The electrical circuit of element 49 comprises the conductors 51, 52, and 53, a source of electricity 54 which may be a transformer secondary winding of low potential, a conductor 55, conductor 56, a closed switch 57, and a conductor 58 to the coil of element 49. The sound producing apparatus comprises a light responsive element 9 through which electricity may pass, and said element 9 is included in the circuit comprising the conductor 59, speaker or amplifier 10, conductor 60, source of electricity 61, conductor 62, the closed switch 14, and a conductor 63 which returns to element 9. The specific construction of the light responsive means 9, which transmits variable electrical impulses to the amplifier apparatus by reason of its subjection to light rays passing through the film, need not be described in detail for such devices are well known to those skilled in the art to which the invention appertains.

As the paying-out reel 5 of machine B gains in speed of rotation, as hereinbefore explained, the contact arm 19 associated therewith approaches and finally connects the first pair of contacts 64 of the board 18, which results in the closing of an electrical circuit embracing the illuminator 2 of the idle machine A. Said circuit comprises the conductor 65, an electromagnetic means 66 which throws a switch contact 67, a conductor 68, the source of electricity 54, the conductors 55, 69, and 70 which leads to the contact strip 21 (Fig. 2) on the contact arm 19. The foregoing circuit is but momentarily closed, because the contact arm 19 of machine B continues to advance, but the momentary closing of the circuit effected movement of switch 67 for closing the circuit of the illuminator 2 of the idle machine A. The said illuminator circuit includes the illuminator 2, conductor 71, switch contact 67, conductor 72, the source of electricity 38 and conductor 73 which returns to the illuminator. From the foregoing it is understood that the idle machine A has its illuminator circuit energized, while machine B is in operation.

Continued advancement of the contact arm 19 of machine B causes the second pair of contacts 74 to be connected electrically, for initiating energization of motor 7 of machine A. The circuit includes a conductor 75, an electromagnetic switch throwing device 76, conductors 77 and 53, the source of electricity 54, conductors 55, 69, and 70 which returns to the pair of contacts 74. Completion of the foregoing circuit effected a movement of the movable switch contact 78 associated with the magnetic means 76, whereby the conductor 79 of motor 7 of machine A was connected electrically with a conductor 80 leading to the source of electricity 46, whence the circuit continues over wire 47 and a wire 81 which connects with the motor 7 of machine A. The motors of both machines, therefore, are now in operation. The contact bar 19 of machine B, having passed the pair of contacts 74, contacts the pairs of contacts indicated at 82, 83, and 84, which effects simultaneous closing of the machine B shutter and opening of the machine A shutter, while at the same time the light responsive device 9 of machine A is placed in operation and that of machine B is rendered inoperative, by the automatic throwing of switch contact 14. Switch contact 14, upon energization of the magnetic means 85, electrically connects the elements 9, 10, and 61, by means of the conductors 86 and 87. The circuit embracing the magnetic means 85 comprises the conductors 88 and 53, the source of electricity 54, conductors 55, 69 and 70, the contacts 83 which now are in electrical communication through the contact bar, and the conductor 89. The foregoing explains the manner of shifting the sound apparatus so that it will operate with machine A rather than with machine B. By tracing the conductors leading from the contacts 82 of machine B, it is clearly evident that closing of the circuit through said contacts causes energization of a magnet 90, which attracts the movable switch terminal 57 and thereby opens the circuit of the solenoid 49 for release of the shutter 3 of machine B, thereby permitting the shutter to move to the closed or operative position. In a like manner, electrical connection of the contacts 84 by the contact bar 19 of machine B, effects energization of the magnetic means 91 of a switch 92 for throwing the switch into operation and closing an electrical circuit through the solenoid 93 of machine A, which raises or retracts the shutter 3 associated therewith. Machine A, therefore, is now in operation and is projecting its film characters.

The last pairs of contacts on the board 18 of machine B are indicated at 94 and 95, and these contacts, when connected by means of the contact bar 19, provide electrical circuits whereby means are actuated for rendering inoperative both the illuminator and the motor of machine B. Tracing the conductors leading from the contacts 95, it is found that the circuit includes an electromagnetic means 96 which attracts the movable switch terminal 41 and thereby breaks the circuit of the illuminator 2 of machine B. By tracing the conductors leading from the pair of contacts 94 above mentioned, it is plainly evident that the contact bar, when striking said contacts, completes an electrical circuit through a magnetic attracter 97 which opens the switch 44 to break the electrical circuit of the motor 7 of machine B. Machine B thereby is rendered completely inoperative, and as its motor stops the contact bar 19 associated with machine B rotates in a counter-clockwise direction and returns to its normal position against the stop 37.

During the time that machine B is inoperative, the machine A is projecting its film characters, and as the film unwinds from reel 5 of machine A the contact bar 19 of machine A approaches the pairs of contacts 98 to 104, inclusive. When the film is nearly payed out, the contact bar 19 of machine A makes a connection across the contacts 98, thereby completing the electrical circuit consisting of conductor 105, magnetic attracter 106, conductors 52 and 53, source of electricity 54, conductor 55, and conductor 107 of the machine A contact board 18. Said attracter 106, being thereby energized, attracts the movable switch terminal 41, which closes the circuit of the illuminator 2 of machine B, as indicated. Further advancement of the contact bar affords an electrical connection across the pair of contacts 99 whereby there is completed an electrical circuit comprising the conductor 108, a magnetic attracter 109, conductors 110 and 53, source of electricity 54, and conductors 55 and 107. The magnetic attracter 109 being thereby energized, attracts the movable switch contact 44 and closes the electrical circuit of the motor 7 of machine B, which begins the unwinding of film from the reel 5 of machine B. The starting of machine B is followed by the opening of its shutter and shifting of the sound or acoustic apparatus, simultaneously with the closing of the shutter 3 of machine A, or, to state more specifically, the connection made across the pair of contacts 100 effects energization of the magnetic attracter 113, thereby breaking the electrical circuit of the solenoid 93 and releasing or dropping the shutter 3 associated therewith: the connection made across the pair of contacts 103 effects energization of a magnetic attracter 114 which attracts the movable switch element 57 for completing an electrical circuit through the solenoid 49 whereby to withdraw or open the shutter 3 of machine B; and the connection made across the pair of contacts 102, by the contact bar 19, closes a circuit through the magnetic attracter 115, thereby causing attraction of the movable switch element 14 and placing the light responsive sounding device 9 of machine B in electrical association with the speaker or amplifier 10.

As the contact bar 19 of machine A advances further it provides an electrical connection across the pairs of contacts 101 and 104. The closing of the circuit embracing the contacts 101 provides for energization of the magnetic attracter 116 which acts upon the movable switch element 78 for breaking the circuit of the motor 7 on machine A. The closing of the circuit embracing the contacts 104 provides for energization of the magnetic attracter 117 which acts upon the movable switch contact 67 for breaking the electrical circuit of the illuminator 2 of machine A. Machine A, in accordance with the foregoing, is rendered completely inoperative and machine B is automatically placed in operation.

The above described automatic operations repeat themselves, one machine being in operation while the other is idle, and the operator of the machines need only adjust the arcs and replace reels of film in the idle machine while the other machine is in operation.

It is to be understood that the invention may be practiced with the use of electrical and magnetic switches and contactors of various types, and that means other than the reel supporting shafts 5 may be chosen for driving the automatic means for mutual control of the picture projection machines. It is to be understood that various other modifications and changes in structural details of the device may be made, within the scope of the appended claims, without departing from the spirit of the invention.

What is claimed is:

1. The combination of a pair of motion picture projection machines each comprising a pair of film transferring reels, an illuminator for the film, a motor for driving one of the reels, a shaft rotatable with the other reel and by reason of the unwinding of film therefrom to the driven reel said shaft and its associated reel are rendered variable in speed of rotation, a movable member and means operatively connecting it with the shaft for advancing said movable member as the speed of rotation of the reel shaft increases, and means operable by the advancing movable member for operating the motor and conditioning for operation the illuminator of one machine and for rendering inoperative the motor and illuminator of the other machine, in succession.

2. The combination of a pair of motion picture projection machines each comprising a pair of film transferring reels, an illuminator for the film, a shutter movable to operative and inoperative positions into and from the line of projection of the illuminator, a sound producing device responsive to variation in the film, a motor for driving one of the reels, a shaft rotatable with the other reel and rendered variable in speed of rotation by reason of the unwinding of film onto the driven reel from the other reel, a movable member and means operatively connecting it with the shaft for advancing said movable member as the speed of rotation of the reel shaft increases, and means operable by the advancing movable member of one of said machines for rendering operable the motor, the illuminator and the sound producing device of said other machine and for rendering inoperative the corresponding elements of said first machine, and means for simultaneously rendering operative the shutter of one machine while effecting an inoperative condition of the shutter of the other machine.

3. The combination of a pair of motion picture projection machines each comprising a pair of film transferring reels, an illuminator for the film, a motor for driving one of the reels, a sound producing device responsive to variations in the film, a shutter movable to operative and inoperative positions in the line of light projection of the illuminator, of means responsive to variation in speed of rotation of one of the film reels resulting while the film is transferring from one reel to the other, for rendering operable the motor, the illuminator, and the sound producing device of one machine and for rendering inoperative the corresponding elements of the other machine, and for simultaneously moving one shutter to the operative position and the other shutter to an inoperative position.

4. The combination of a pair of motion picture projection machines each comprising a film pay-out reel, an illuminator for the film, a motor for moving the film to unwind it from the reel, a sound producing device responsive to variations in the film, a shutter movable to operative and inoperative positions in the line of light projection of the illuminator, of means responsive to variation in speed of rotation of the pay-out reel resulting while the film is unwinding at a constant rate of linear movement for rendering operable the motor, the illuminator, and the sound producing device of one machine and for rendering inoperative the corresponding elements of the other machine, and for simultaneously moving one shutter to the operative position and the other shutter to an inoperative position.

5. The combination with a plurality of motion picture projection machines each comprising a pair of film transferring reels, an illuminator for the film, and a motor for advancing the film past the illuminator while the film is payed out from one reel and wound onto the other reel whereby to cause a gradual variation in the speed of rotation of one of the reels, of means responding to said variation in reel speed for control of the illuminator and motor of each machine.

6. The combination with a plurality of motion picture projection machines each comprising a pair of film transferring reels, an illuminator for the film, and a motor for advancing the film past the illuminator while the film is payed out from one reel and wound onto the other reel whereby to cause a gradual variation in the speed of rotation of one of the reels, of means on one of said machines responding to said variation in reel speed of said one machine, for control of the illuminator and motor of the other machine.

7. The combination with a plurality of motion picture projection machines each comprising a reel for motion picture film, a motor, and means including the motor for advancing the film and causing rotation of the reel at a gradually changing speed as the diameter of the reel hub changes due to the change in the amount of film constituting the hub while the motor means is operating, of means responding to said changing reel speed for controlling operation of the motor of one of the machines.

8. The combination with a plurality of motion picture projection machines each comprising a reel for motion picture film, a motor, and means including the motor for advancing the film and causing rotation of the reel at a gradually changing speed as the diameter of the reel hub changes due to the change in the amount of film constituting the hub while the motor means is operating, of a series of electrical circuits and contacts arranged to control the operation of the respective machines, and means responding to said changing reel speed for closing the electrical circuits through said contacts.

9. The combination with a plurality of motion picture projection machines each comprising a reel for motion picture film, a motor, and means including the motor for advancing the film and causing rotation of the reel at a gradually changing speed as the diameter of the reel hub changes due to the change in the amount of film constituting the hub while the motor means is operating, of a series of electrical circuits and contacts in the circuits for controlling the operation of the respective machines, a tachometer device associated with each machine and means for driving said device from the variable speed reels, and means associated with each tachometer device for closing the electrical circuits at the said contacts of the respective machines.

10. The combination with a plurality of motion picture projection machines each comprising a reel for motion picture film, a motor, and means including the motor for advancing the film and causing rotation of the reel at a gradually changing speed as the diameter of the reel hub changes due to the change in the amount of film constituting the hub while the motor means is operating, of a series of electrical circuits and contacts in the circuits for controlling the operation of the respective machines, a tachometer device associated with each machine and means for driving said device from the variable speed reels, means associated with each tachometer device for closing the electrical circuits at the said contacts of the respective machines, an electricity responsive controller on the first machine having electrical connection with a closable contact of the second machine, and an electricity responsive controller on the second machine having electrical connection with a closable contact on the first machine.

11. The combination with a motion picture projecting machine comprising a reel for motion picture film, a motor, and means including the motor for advancing the film and causing rotation of the reel at a gradually changing speed as the diameter of the reel hub changes due to the change in the amount of film constituting the hub while the motor means is operating, of a series of electrical contacts and circuits closable for controlling a second machine, and means responding to said changing reel speed arranged for traversing said contacts and making closed circuit contact therewith.

12. The combination with a motion picture projecting machine comprising a reel for motion picture film, a motor, and means including the motor for advancing the film and causing rotation of the reel at a gradually changing speed as the diameter of the reel hub changes due to the change in the amount of film constituting the hub while the motor means is operating, of a series of electrical contacts and circuits for controlling the operation of a second machine, a tachometer device and means for driving said device from the variable speed reel, and means associated with the tachometer device and arranged for traversing said contacts to close said circuits.

13. The combination with a motion picture projecting machine comprising a reel for motion picture film, a motor, and means including the motor for advancing the film and causing rotation of the reel at a gradually changing speed as the diameter of the reel hub changes due to the change in the amount of film constituting the hub while the motor means is operating, of a series of electrical contacts, and means responding to said changing reel speed for traversing said contacts and making electrical contact therewith.

14. The combination with a motion picture projecting machine comprising a reel for motion picture film, a motor, and means including the motor for advancing the film and causing rotation of the reel at a gradually changing speed as the diameter of the reel hub changes due to the change in the amount of film constituting the hub while the motor means is operating, of a series of electrical contacts, electrical circuits, and electro-responsive controllers connected in said circuits and under the control of said contacts, and means responding to said changing reel speed for traversing said contacts and making electrical contact therewith.

15. The combination with a plurality of motion picture projection machines each comprising a pair of film transferring reels, an illuminator for the film, and a motor for advancing the film past the illuminator while the film is payed out from one reel and wound onto the other reel whereby to cause a gradual variation in the speed of rotation of one of the reels, of means responding to said variation in reel speed for control of the illuminator of each machine.

16. In combination with a motion picture projecting machine comprising at least one rotatable transfer reel for spirally wound film, an illuminator for the film, and means for transferring the film relative to the reel and moving the film at a substantially uniform rate of speed past the illuminator as the reel rotates at an ever-changing speed due to the transfer and the resultant change in the effective hub diameter of the reel, which hub diameter is constituted chiefly of the spirally wound film, and means responsive to the variation of reel speed for controlling a second machine.

17. In combination with a motion picture projecting machine comprising at least one rotatable transfer reel for spirally wound film, an illuminator for the film, and means for transferring the film relative to the reel and moving the film at a substantially uniform rate of speed past the illuminator as the reel rotates at an ever-changing speed due to the transfer and the resultant change in the effective hub diameter of the reel, which hub diameter is constituted chiefly of the spirally wound film, a series of electrical circuits, and means including mechanism driven at a varying speed proportional to that of the ever-changing reel speed, for controlling said electrical circuits at given times during the period of reel movement.

18. In combination with a motion picture projecting machine comprising at least one rotatable transfer reel for spirally wound film, an illuminator for the film, and means for transferring the film relative to the reel and moving the film at a substantially uniform rate of speed past the illuminator as the reel rotation at an ever-changing speed due to the transfer and the resultant change in the effective hub diameter of the reel, which hub diameter is constituted chiefly of the spirally wound film, a series of electrical circuits, an electrically energizable element in each of said electrical circuits, and means including mechanism driven at a varying speed proportional to that of the ever-changing reel speed, for controlling said electrical circuits and the energizable elements connected therein.

19. In combination a pair of motion picture projecting machines and photo-electric sound producing apparatus associated with each machine, each machine comprising at least one rotatable transfer reel for spirally wound film, and means for transferring the film relative to the reel and moving the film at a substantially uniform rate through the machine as the reel rotates at an ever-changing speed due to the transfer and the resultant change in the effective hub diameter of the reel, which hub diameter is constituted chiefly of the spirally wound film, a shutter associated with each machine for intercepting projected pictures, sound amplifier means common to the photo-electric sound apparatus of both machines, a mechanism for operating the shutters simultaneously but oppositely so that one shutter closes when the other opens, means associated with said mechanism for connecting the common sound amplifier means selectively to the photo-electric sound producing apparatus of the machines, and means including mechanism driven by the variable speed reel for actuating the shutter operating mechanism and consequently the selectively connecting means for the amplifier.

20. In combination a pair of motion picture projecting machines and photo-electric sound producing apparatus associated with each machine, a film reel on each machine and means for rotating same, a shutter associated with each machine for intercepting projected pictures, sound amplifier means common to the photo-electric sound apparatus of both machines, a mechanism for operating the shutters simultaneously but oppositely so that one shutter closes when the other opens, means associated with said mechanism for connecting the common sound amplifier means selectively to the photo-electric sound producing apparatus of the machines, and means driven by the reel for actuating said last mentioned means.

21. In combination a pair of motion picture projecting machines and photo-electric sound producing apparatus associated with each machine, each machine comprising at least one rotatable transfer reel for spirally wound film, and means for transferring the film relative to the reel and moving the film at a substantially uniform rate through the machine as the reel rotates at an ever-changing speed due to the transfer and the resultant change in the effective hub diameter of the reel, which hub diameter is constituted chiefly of the spirally wound film, a shutter associated with each machine for intercepting projected pictures, sound amplifier means common to the photo-electric sound apparatus of both machines, a mechanism for operating the shutters simultaneously but oppositely so that one shutter closes when the other opens, means operating substantially concurrently with said mechanism for connecting the common sound amplifier means selectively to the photo-electric sound producing apparatus of the machines, and means including mechanism driven by the variable speed reel for actuating the shutter operating mechanism and consequently the selectively connecting means for the amplifier.

22. In combination a pair of motion picture projecting machines and photo-electric sound producing apparatus associated with each machine, a film reel on each machine and means for rotating same, a shutter associated with each machine for intercepting projected pictures, sound amplifier means common to the photo-electric sound apparatus of both machines, a mechanism for operating the shutters simultaneously but oppositely so that one shutter closes when the other opens, means operating substantially concurrently with said mechanism for connecting the common sound amplifier means selectively to the photo-electric sound producing apparatus of the machines, and means driven by the reel for actuating said last mentioned means.

23. In combination with a motion picture projecting machine comprising at least one rotatable transfer reel for spirally wound film, an illuminator for the film, and means for transferring the film relative to the reel and moving the film at a substantially uniform rate of speed past the illuminator as the reel rotates at an everchanging speed due to the transfer and the resultant change in the effective hub diameter of the reel, which hub diameter is constituted chiefly of the spirally wound film, an electrical circuit, and means including mechanism driven at a varying speed proportional to that of the ever-changing reel speed, for controlling said electrical circuit at a given time during the period of reel movement.

24. In combination with a motion picture projecting machine comprising at least one rotatable transfer reel for spirally wound film, an illuminator for the film, and means for transferring the film relative to the reel and moving the film at a substantially uniform rate of speed past the illuminator as the reel rotates at an ever-changing speed due to the transfer and the resultant change in the effective hub diameter of the reel, which hub diameter is constituted chiefly of the spirally wound film, an electrical circuit, an electrically energizable element in said electrical circuit, and means including mechanism driven at a varying speed proportional to that of the ever-changing reel speed, for controlling said electrical circuit and the energizable element connected therein, at a given time during the period of reel movement.

25. In combination with a motion picture projecting machine comprising at least one rotatable transfer reel for spirally wound film, an illuminator for the film, and means for transferring the film relative to the reel and moving the film at a substantially uniform rate of speed past the illuminator as the reel rotates at an ever-changing speed due to the transfer and the resultant change in the effective hub diameter of the reel, which hub diameter is constituted chiefly of the spirally wound film, and means including mechanism driven at a varying speed proportional to that of the ever-changing reel speed for controlling a second machine.

26. The combination with a motion picture projecting machine comprising a reel for motion picture film, a motor, and means including the motor for advancing the film and causing a rotation of the reel at a gradually changing speed as the diameter of the reel hub changes due to to the change in the amount of film constituting the hub while the motor means is operating, of a series of electrical contacts and electrical circuits and means responding to said changing reel speed, arranged for traversing said contacts and closing said electrical circuits.

27. The combination with a motion picture projecting machine comprising a reel for motion picture film, a motor, and means including the motor for advancing the film and causing rotation of the reel at a gradually changing speed as the diameter of the reel hub changes due to the change in the amount of film constituting the hub while the motor means is operating, of a series of electrical circuits and electrical contacts for controlling an electro responsive device, a tachometer device and means for driving said device from the variable speed reel, and means associated with the tachometer device and arranged for traversing said contacts to close said circuits to the electro responsive device.

HENRY G. WEISS.